US011095576B2

(12) United States Patent
Selinger (10) Patent No.: US 11,095,576 B2
(45) Date of Patent: Aug. 17, 2021

(54) AUTOMATED, USER IMPLEMENTED, SECURE DOCUMENT AND COMMUNICATION CREATION AND MANAGEMENT SYSTEM AND METHOD

(71) Applicant: Ronnie Selinger, Davie, FL (US)

(72) Inventor: Ronnie Selinger, Davie, FL (US)

(73) Assignee: NORDIS INC., Coral Springs, FL (US)

( * ) Notice: Subject to any disclaimer, the term of this patent is extended or adjusted under 35 U.S.C. 154(b) by 938 days.

(21) Appl. No.: 14/120,772

(22) Filed: Jun. 25, 2014

(65) Prior Publication Data

US 2015/0381535 A1  Dec. 31, 2015

(51) Int. Cl.
*G06F 15/16* (2006.01)
*H04L 12/58* (2006.01)
*G06Q 30/00* (2012.01)
*H04W 4/14* (2009.01)

(52) U.S. Cl.
CPC ........... *H04L 51/02* (2013.01); *G06Q 30/018* (2013.01); *H04W 4/14* (2013.01)

(58) Field of Classification Search
CPC ........ G06Q 30/018; H04L 51/02; H04W 4/14
See application file for complete search history.

(56) References Cited

U.S. PATENT DOCUMENTS

| 2003/0009529 | A1* | 1/2003 | Powers | G06Q 10/107 709/206 |
| 2003/0172167 | A1* | 9/2003 | Judge | H04L 51/12 709/229 |
| 2003/0200234 | A1* | 10/2003 | Koppich | G06F 17/30011 |
| 2006/0004642 | A1* | 1/2006 | Libman | G06Q 30/0247 705/14.49 |
| 2012/0179677 | A1* | 7/2012 | Roselli | G06Q 10/10 707/736 |

\* cited by examiner

*Primary Examiner* — Normin Abedin
(74) *Attorney, Agent, or Firm* — Bayes PLLC (57) ABSTRACT

A secure document creation and distribution system, method and computer product for generating customized documents to be delivered to third parties either in printed or electronic format. The system provides the separation of a document presentation and its contents for reuse, variable data publishing and multiple presentations embedded within the same document for delivery over different channels. The system provides multiple templates, content management, business rules, dynamic merge and process control to permit information to be collected from the generating entity or Client-user and merged into multiple documents, campaigns and communications to third parties in multiple formats, according to the Client-user's specification and directions.

24 Claims, 5 Drawing Sheets

AUTOMATED, USER IMPLEMENTED, SECURE DOCUMENT AND COMMUNICATION CREATION AND MANAGEMENT SYSTEM AND METHOD

FIELD OF THE INVENTION

The present invention relates to the field of automated, Client-user implemented, secure document creation and distribution to permit customized documents to be created by a Client-user and then delivered to third parties designated by the Client-user in either printed or electronic format. The system permits highly customizable documents to be generated by the Client-user with little or no input from the system manager by providing the user with multiple templates, content management and process control. This permits information to be collected from the generating entity or user and merged into multiple documents, campaigns and communications to third parties in multiple formats, according to the Client-user'specification. The present invention permits individual job design, management of the contents of the job, data insertion and manipulation, reporting management and related tools that permit the final documents to be communicated in printed or electronic format, through traditional mail delivery or e-mail, as well as SMS/text messaging and other transmission means. The invention further provides for the creation of on-line response mean through a proxy module wherein a recipient of a proxy or other material may respond to the proxy by electronic response or hard copy response, which may then be converted to electronic compilation of responses. The present invention also provides for a compliance module to permit material to be reviewed at various points in the production cycle to ensure compliance with a client-user's internal rules and compliance with state, federal and other statutory and regulatory rules.

BACKGROUND OF THE INVENTION

The generation of documents for distribution to third parties in, for example, ad campaigns or other forms of mailings, has typically been a complicated manual task involving the labor of a number of people and often requiring repeated back and forth between the entity seeking to create the documents and the printer or entity that is responsible for actually generating the document. This is often further exacerbated when the creating entity has multiple layers of personnel who are required to provide input to the document and approval for the interim and final document product.

All of this creates delay and the real possibility of errors which are undetected until late in the document creation cycle. The generation of such customized documents (e.g., campaigns, mass mailings, reports, and the like) has required the expense and participation of a number of professionals, both inside the creating entity and within the publishing entity and has been beyond the ability of automation. When automation has been attempted, it has generally required a custom application or a special-purpose system that is not available to the majority of users.

One existing technique is to use HTML or XML coding to define fields and other decision trees that can be used to build a document. Such technique's require substantial knowledge of coding and prevent those who understand the document best from being closely involved with the generation of a document.

Oftentimes a user (creator) creates a document or a program according to a work process flow as is described below. First, the user (creator) creates a document or a program and edits the document until the creator feels that the document has reached a certain level of completion. Then, the user submits the document to a supervisor who checks the document. Then, the user edits the document once more based on remarks and corrections made by the supervisor. From there, the document might be submitted to a printer or other outside entity for formatting and creation of a mock-up or sample which would then be returned to the user or supervisor for approval.

According the work process flow as is described above, a document or a program may be created without notable problems when the user (creator) understands what kind of document the supervisor (checker) is demanding and where the entity that is ultimately going to generate the document also understands what kind of document is to be ultimately created. However, when there is a misunderstanding on the creator's side to and a document is created that is significantly different from what the supervisor (checker) has in mind, the supervisor (checker) has to make significant changes to the document created by the user (creator), this being a burden on the supervisor's side, and the user (creator) has to make extensive edits on his/her document based on instructions and advice from the supervisor, this being a burden on the user's side. In such a case, it creates a burden on both the user (creator) and the supervisor (checker) and delays the generation of a document that can be transmitted to the third party for the preparation of the final proof.

Accordingly, in recent years and continuing into the present, various techniques are being developed for enabling a creator and a checker to create and edit work such as a document in a collaborative manner so as to reduce the burden of both the creator and the checker. Examples of such prior art techniques are described below.

Japanese Laid-Open Patent Publication No. 2000-020508 discloses a system for collaboratively editing work through monitoring the work of other users (creators). This system enables' a user to view the edits of other users as reference or guidance, for example.

Japanese Laid-Open Patent Publication No. 5-028138 discloses a document editing system enabling plural users to edit the same section of a document. According to this system, plural users may edit a document while referring to edits of other users to avoid inconsistencies and contradictions.

U.S. Patent Application 2014/0115443 describes a method and system to permit the creation of professional documents such as contracts, wills, trusts etc. where a document template includes much of what is required for the professional document and there is included a place holder and section holder for insertion of user specific data to complete the document. However, this system continues to be an internal system that is designed to create a limited document universe based on pre-set input which is required for the generation of a legally binding document.

Document-centric workflows are fundamental to many organizations. At the same time, document sharing, workflow support, user authentication and other workflow-enabling services are often locked within organizational firewalls for various reasons, ranging from the organization's security policies to software license concerns. Internal processes, however optimized and important, may only be a small part of the business of large companies. They may not be able to exist without collaborating with customers, partners, suppliers and vendors.

Various types of external collaborations are emerging too: companies forming alliances, participating in standards bodies or forums, acquiring government certifications, undergoing external audits, and outsourcing or merging. These are just a few examples of 'non-contained' document workflows. These cross-organizational workflows often carry information of different levels of sensitivity: auditing information, prospective mergers and acquisitions, tender proposals or patent applications, etc., many of which may involve multiple participants from different organizations, and security domains that require different levels of access.

Despite the growing availability of cloud-based and other web services, it is often difficult, undesirable or impracticable to involve third party services to provide access control and workflow order enforcement as both the confidential document contents and the authentication of workflow participants may need to be fully disclosed to such a service. The situation can be further exacerbated if the existence of the workflow itself is desired to remain confidential. As a result, documents are often delivered over traditional e-mails or posted on portable storage media, such as flash drives, CD, DVD, etc.

The situation may further be complicated by increasing document complexity. Increased complexity includes the separation of a document presentation and its content for reuse, variable data publishing and multiple presentations embedded within the same document for a delivery over different channels. Documents have often become composites of differently formatted files and their fragments "glued" together by various applications.

Thus, a continuing need exists for a system that allows for the secure creation and distribution of customized documents by Client-users to be delivered to third parties either in printed or electronic format. There is further a continuing need for a system to permit the automatic generation of customized documents with direct Client-user input that is easy to use, permits the generation of substantially final documents without the need, after initial implementation, for third-party (printer) intervention and is accessible to a wide group of diverse end-users. The present invention solves these needs and others as described in the sections below.

SUMMARY OF THE INVENTION

According to an embodiment of the present invention, a document creating system is provided to permit a Client-user (including a plurality of persons who are associated with a Client or customer, using a plurality of terminal apparatuses that are interconnected via a network) to create a document by providing input data and custom Client-defined rules, the system including setting a condition for creating initial Client-defined rules. The system permits Client implementation to allow the user to maintain and keep document versions and keep making changes as needed to create a document at a terminal apparatus of the Client. The system further provides Client-user editing for the document created at the terminal apparatus by additional appropriately designated Client-users who have approval authority and may edit at either the terminal apparatus or on the fly at another terminal apparatus with the editing function continuing until the final edit condition is satisfied.

According to another embodiment of the present invention, a document creating system is provided for collaboratively creating a document by a plurality of Client-user personnel using a plurality of terminal apparatuses that are connected via a network, the system including setting an editing function for realizing the editing method to the document created at the terminal apparatus and permitting the document created at the terminal apparatus to obtain stored data to permit previously used material to be part of the currently created document, in accordance with Client-user defined rules.

According to an embodiment of the present invention, the custom document creating system of the present invention may be realized wherein the system includes a server and a plurality of Client-users are simultaneously connected to the server to permit each Client-user to create simultaneously individual, unique and customized documents.

According to another embodiment of the present invention, a computer-readable program is provided that is run on a processor implemented in a document creating system that is connected to a terminal apparatus via a network in a network system and is adapted to realize collaborative creation of a document by one or more Client-user personnel, the program being executed by the computer to perform a method comprising setting and implementing Client-user defined rules to create customizable documents and set conditions for finalizing a created document for transmittal via printed or electronic means.

According to another embodiment of the present invention, a storage medium is provided that stores a program of the present invention for use by multiple Client-users to generate individual custom documents.

According to another embodiment of the present invention, a data structure of a document is provided and available to each Client-user that includes a program of the present invention, a document file of a created document or documents, and a program for viewing the document file.

In one aspect, the present invention provides a system and methodology for permitting Client-users to create customized documents internally and maintain the ability to re-customize the documents. The system includes a server to provide and store a document generation screen to permit access to a document template. The system further comprises a multi-zone content layout with node-tabs for collecting information from a Client-user, where the information collected is related to one or more of the zones and may be used in one or more of the documents for creating customized documents.

In yet another aspect of the invention, the system permits collection of information from either one or more personnel and/or files can be received in an automated manner. The system can then accept the files and information to merge the presentation, data and content for document output in any of a number of electronic forms and hard copy. All of the above may accomplished within a Client-user's environment, after initial implementation, for merging information collected from a Client-user, either from personnel or automatically, with the document generation screen to create a customized document.

The system further provides the separation of a document presentation and its contents for reuse, variable data publishing and multiple presentations embedded within the same document for delivery over different channels.

In another aspect, the node-tabs of the multi-zone layout perform logical actions in response to information collected from the Client-user personnel to create packages of customized documents for transmission.

In still another aspect, the logical actions are selected from a group consisting of filling node-tab area and zones, adding information and/or data, removing information and/ or data, presenting further information queries, where information and/or data may be Client-user generated and may be comprised of pictorial, graphic, text or other input, modifying personnel interaction level, providing stored information and/or data to the Client-user, providing tools to the Client-user, providing information to the end-user, and presenting the Client-user with multiple transmission opportunities.

It is yet another aspect of the present invention that the information and/or data may be selected from a group comprised of Client-user defined rules and data and/or generic data and further comprised of detailed descriptions, questions, and options, and is in a format selected from a group consisting of text, graphics and other media variations now employed or to be developed in the future.

It is a further aspect of the invention that the system comprises one or more storage media to store a set of information and/or data collected or otherwise obtained from each Client-user, transmitting means to direct the information to another node-tab for merging with one or more other document templates, whereby the efficiency, accuracy, and consistency of a Client-user's creation of custom documents is enhanced.

In a still further aspect, information is collected from multiple individuals within and without a Client-user, each of whom has been granted access to the system, and is merged with the document template to create a collaborative custom document.

A further aspect of the invention comprises security means to permit an administrative end-user to grant access privileges, where the administrative end-user determines a degree of access for other end-users.

It is yet another aspect of the invention to provide a secure means for Client-users to transmit data, graphics, text and other material in order to permit the creation of Custom Documents at a location away from the Client-user and to permit secure creation of Custom Documents at that location.

It is yet another aspect of the invention to provide a secure means for Client-users to transmit data, graphics, text and other material in order to permit the creation of Custom Documents at a location away from the Client-user and transmission of those Custom Documents in a secure manner to designated third-parties.

In a yet further aspect, the invention further comprises a processor to store a set of information collected from the end-user as a Client-user profile and map the information from the Client-user profile to re-generate new custom documents and for merging multiple document templates to enhance the efficiency, accuracy, and consistency of a Client-user's creation of customized documents.

In another aspect, the node-tab/merge engine is configured to merge the information collected from the end-user with multiple document templates to create multiple customized documents.

In yet another aspect, the document template is a multimedia document template and the customized document is a multimedia document.

In another aspect of the invention it further provides for the creation of on-line response mean through a proxy module wherein a recipient of a proxy or other material may respond to the proxy by electronic response or hard copy response, which may then be converted to electronic compilation of responses.

In yet another aspect of the present invention it also provides for a compliance module to permit material to be reviewed at various points in the production cycle to ensure compliance with a client-user's internal rules and compliance with state, federal and other statutory and regulatory rules. Such compliance rules may, illustratively, fall into categories such as rules by industry or communication type, such as marketing, financial, medical, HOA and others. The rules may also fall into multiple categories, such as medical billing or legal content verbiage and may have additional rules for specific verticals. The rules may also regard content and limitation factors, qualifications or safe harbor provisions. Furthermore, the rules may have internal values such as how often a certain type of communication may be sent before it is modified. The above compliance indications are illustrative only.

DETAILED DESCRIPTION

Certain terminology may be used in the following description for convenience only and is not limiting. For example, the words "lower" and "upper" and "top" and "bottom" designate directions only and are used in conjunction with such drawings as may be included to fully describe the invention. The terminology includes the above words specifically mentioned, derivatives thereof and words of similar import.

Where a term is provided in the singular, the inventor also contemplates aspects of the invention described by the plural of that term. As used in this specification and in any claims, the singular forms "a", "an", and "the" include plural references unless the context clearly dictates otherwise, e.g. "a derivative work". Thus, for example, a reference to "a method" includes one or more methods, and/or steps of the type described therein and/or which will become apparent to those persons skilled in the art upon reading this disclosure.

Unless defined otherwise, all technical, legal, copyright related and scientific terms used herein have the same meaning or meanings as commonly understood by one of ordinary skill in the art to which this invention belongs. Although any methods and materials similar or equivalent to those described herein can be used in the practice or testing of the present invention, the preferred methods, constructs and materials are described herein. All publications mentioned herein, whether in the text or by way of numerical designation, are incorporated herein by reference in their entirety. Where there are discrepancies in terms and definitions used by reference, the terms used in this application shall have the definitions given herein.

The term "variation" of an invention includes any embodiment of the invention, unless expressly specified otherwise.

A reference to "another embodiment" in describing an embodiment does not necessarily imply that the referenced embodiment is mutually exclusive with another embodiment (e.g., an embodiment described before the referenced embodiment), unless expressly specified otherwise.

The terms "include", "includes", "including", "comprising" and variations thereof mean "including but not limited to", unless expressly specified otherwise.

The term "consisting of" and variations thereof includes "including and limited to", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The terms "such as", and/or "e.g." and like terms means "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other, things besides "instructions" and "a data structure" can be "data".

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like. It does not imply certainty or absolute precision, and does not imply that mathematical processing, numerical methods or an algorithm process be used. Therefore "determining" can include estimating, predicting, guessing and the like.

It will be readily apparent to one of ordinary skill in the art that the various processes described herein may be implemented by, e.g., appropriately programmed general purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. For clarity of explanation, the illustrative system embodiment is presented as comprising individual functional blocks (including functional blocks labeled as a "processor" or "engine"). The functions these blocks represent may be provided through the use of either shared or dedicated hardware, including, but not limited to, hardware capable of executing software. For example, the functions of one or more processors presented in FIG. 2, may be provided by a single shared processor or multiple processors. Use of the term "processor" should not be construed to refer exclusively to hardware capable of executing software. Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

A "processor" includes one or more microprocessors, central processing units (CPUs), computing devices, microcontrollers, digital signal processors, or like devices or any combination thereof. Thus a description of a process is likewise a description of an apparatus for performing the process. The apparatus can include, e.g., a processor and those input devices and output devices that are appropriate to perform the method. Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" includes any medium that participates in providing data (e.g., instructions, data structures) that may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Some specific terminology will be used to describe the method, system, and computer program product according to the principles of the present invention. These terms are used to describe the concepts that they represent to reduce any ambiguity that may result if the terms are used without such specific definitions. Among the various components and entities that may be a part of the automated, user implemented custom document creation, management and transmission system of the instant invention, the following terminology may be advantageously employed:

A. Customizable Document, also referred to as a Customized Document or Custom Document, is a document that can take many different final forms depending on options and decisions by a Client-user. As a non-limiting example, a Custom Document could be a part of an ad campaign, mailer, invoice, letter or other document for delivery in either printed or electronic form, that includes optional Client-user customized material based on a number of factors as determined by the Client-user and Client-user rules, and other factors related to such a document. A Custom Document is created by the use of a plurality of node-tabs, where the use of each nod-tab is determined by decisions and choices made by a Client-user. A Customizable Document may also be referred to as a Template.

B. Node Tab is a general zone that may be accessed by and provided to one or more Client-users to make a choice on a Custom Document. The Node Tab may be further customizable by the use of Client-user data and represents data specific to a Client-user and the specific use for which the Custom Document is designed. Non-limiting examples of include name, address, start and end dates, logos, visual elements, stored data and retrieved data. This combination allows the generation of highly customizable Custom Documents.

C. Option Flow is the general customization path that presents the Client-user with the options that may be selected and further sets forth a general order of presentation of these options, where the grouping of these options is in logical activities and steps of the Option Flow. Option Flow may have certain features accessible to multiple personnel within a Client-user environment and may simultaneously have other features accessible to only personnel with designated access.

D. Rules/Instructions are the Client-user determinations that are generated by the Client-user either for a single project or for multiple projects that will allow the system to employ the data and other material the Client-user provides and options the Client-user selects into a final Custom Document.

E. Test/Transform is the process of taking the Rules/Instructions, the Node Tab selections, the Option Flow, and the Client-user's options and data, testing them and transforming them into a final Custom Document.

F. Content Managed Fields are types of Node-tabs and zones that can be automatically filled by the system via previously defined Rule/Instructions the Client-user entered or data previously supplied. For example, if the end-user predefines the Content Managed Fields: Name/Address—Mailing List 1, the system will automatically fill those values in any future document the same Client-user begins where the Custom Document is going to the same group defined by the Mailing List 1. Each Client-user has available Content Managed Fields that are saved separately for each Client-user. Data for a group of personnel for a Client-user may also be stored and applied as needed in as collaborative context.

G. A Client-user is an entity whose inside and outside personnel and designated third-party consultants/independent contractors etc. who are granted access to the system generate and create a Custom Document which, upon final approval, becomes a Final Document which may be transmitted in accordance with the requirements and specifications of the Client-user. The system and methodology permit a Client-user to generate and direct the distribution of Custom Documents where the Client-user controls and implements the fields, options, location, and other metrics to create the final form of a document, including print, electronic, SMS/text and multimedia documents.

Figure 1:
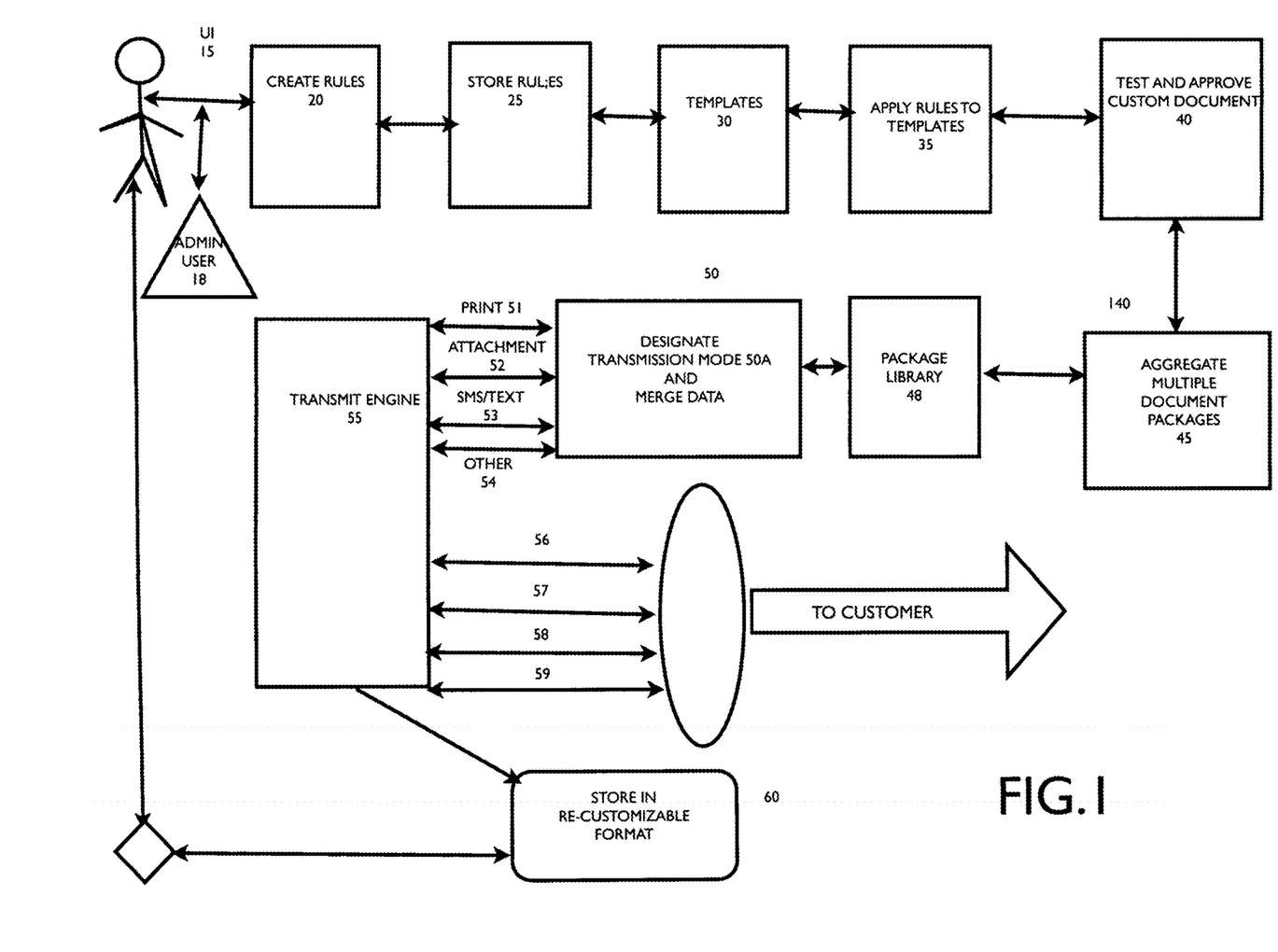
FIG. 1 is a diagrammatic representation of an example of a work-flow configuration of a customized document creation system and methodology in accordance with an embodiment of the invention.

FIG. 1 depicts an illustrative example of a configuration of a customized document creation system in accordance with an embodiment of the invention. Client-user 1, who for purposes of this example is a person with authority to generate and access a set of Rules/Instructions 20, creates the Rules/Instructions 20 for the generation of one or more Custom Documents. The Rules/Instructions 20 may be specific for a set of Custom Documents or may be generic for different types of Custom Documents. The Rules/Instructions 20 may also be dynamic in that they may be altered either before initiating the generation of a Custom Document or may be altered on the fly during the creation of a Custom Document and applied on the fly to that Custom Document.

The Client-user 1 may access the system via the internet through a Client-user interface 15 which is specific to the Client-user, or may access the system by logging on to the system provider's website (not shown) and gaining access through a secure entry sign-in. It will be appreciated that multiple Client-users (1-*n*) may access the system simultaneously and create individual Custom Documents at the same time.

Once the Client-user 1 has accessed the system, he (or she) will store the Rules/Instructions 20 on a server 25 for subsequent use. It will be appreciated that the individual who creates the Rules/Instructions does not have to be the individual or individuals who subsequently access the system to generate the Custom Document. To commence in the creation of a Custom Document, the Client-user 1 accesses the system and any Rules/Instructions 20 stored therein on server 25 and then accesses the Customizable Document processor 30 to obtain one or more Templates 30A found therein.

Each Template 30A is obtained via a pull-down listing to permit the Client-user 1 to select from a variety of different document layouts and communication objectives. For example, an invoice Template (not shown) will have different Node-tabs from a letter Template (not shown), which will be different from an ad campaign Template (not shown).

The Template 30A will be comprised of at least one Node-tab that will permit the Client-user 1 to insert data, information, graphics or other material (collectively "Data") into a specific zone on the Template 30A. The Data may be a function of previously supplied material or may be imported into the zone on the fly at the time of the creation of the Custom Document. It can also be generated by the Rules/Instructions or taken from one or more previously generated Custom Documents, at the discretion and direction of the Client-user 1. Certain of the zones may be designated as "Text" while other may be designated as "Graphics" in accordance with criteria set by the Client-user 1 or by the system provider and/or by the Rules/Instructions.

Alternatively, the zones may be customizable so as to permit the Client-user 1 to vary the location of the zones to further customize the document.

Client-user 1 may also view existing Custom Documents to permit their alteration to create a new Custom Document in substantially the same manner as is set forth above. Once the Client-user 1 has inserted Data into the zones that it seeks to fill, he obtains any additional Data and information that the Rules/Instructions require be inserted into the Custom Document and applies it via processor 35 to the Template 30A. In the event that multiple Custom Documents are to be generated as part of a package, the Data, additional Data and Rules/Instruction information may be applied to each of the Custom Documents simultaneously by the processor 35.

The processor 35 employs a transform and merge engine 38 to aggregate all of the above information and inputs from the Client-user 1 and thereafter transmits the Custom Documents to a test server 40. At the test server 40, the Custom Documents are reviewed and Client-user 1 personnel with administrative/approval authority must sign off on each Custom Document before it is permitted to be transmitted from the test server 40 for ultimate distribution. In the event that the Client-user 1 determines that a Custom Document should not be transmitted from the test server 40, the Custom Document may be stored at a Client-user 1 specific drive or partitioned storage device 140 for subsequent access (see FIG. 2).

After the creation and approval of each Client-user 1 Custom Document, the various Custom Documents can be aggregated to create one or more packages 45 which may be stored in device 140 for ultimate transmittal. The creation of packages 45 is the final step in creating a mailing, via traditional or electronic means, to the ultimate recipient that the Client-user 1 is seeking to communicate with. To create the packages 45, the Client-user accesses the partitioned storage device 140 and designates those Custom Documents that will be placed into a package library 48. Those Custom Documents can be accessed to form multipage packages 45 by designating the Custom Document that will go into each package 45.

The Client-user 1 designates a package 45 name to permit subsequent identification of the specific package 45 and may advantageously employ a package 45 code to link the input data and Custom Documents to the output data which will ultimately be the package 45. Commencement and termination dates, mailing envelope designations and other properties of the package may be specified and saved to create the parameters and properties of the package 45.

Once all of the properties are designated and saved, the Client-user 1 may start to designate those Custom Documents that will form part of the specific package 45. A specific Custom Document can be selected from the package library 48 and associated with the package 45. Once all of the Custom Documents are selected for a specific package 45, the Client-user 1 may designate a transmission mode 50*a* and merge the Custom Documents into a package 45 via a merge and transmit engine 50. If the designated transmission 50*a* is by an actual, physical mailing of the package 45, then the package 45 will be transmitted to a print function location 51 (See also FIG. 5, production shop 551) where the package will be printed, addresses will be associated with the package 45 and it will be transmitted via the specific, physical mailing system designated.

In the event that the transmission mode 50*a* is electronic, then the package 45 is electronically assembled, compressed as needed and formed into an attachment 52 in a recipient non-alterable format, to an electronic address (not shown) for transmittal. Similarly, certain packages 45 may be designed to be transmitted in electronic format such as an SMS/Text message 53 where the content of the package 45 will be more limited, in accordance with SMS protocol.

As is generally depicted in the flow diagram of FIG. 1, the completed package 45 is exported to a transmission processor 55 that is controlled to cause each package 45 to be transmitted (eg. Postal 56, electronic 57, SMS 58, other transmittal mode 59) in accordance with the transmission instructions. The transmission processor 55 may also advantageously transmit the package 45 to a storage device 60 (which may be a part of or associated with the package library 48) where the package 45 may be stored for further customization or for re-customization to create one or more revised Custom Documents and subsequent packages 45. The transmission processor 55 will transmit the package 45 to the storage device 60 in alterable form so that the various Custom Documents in each package 45 may be subsequently altered.

Figure 2:
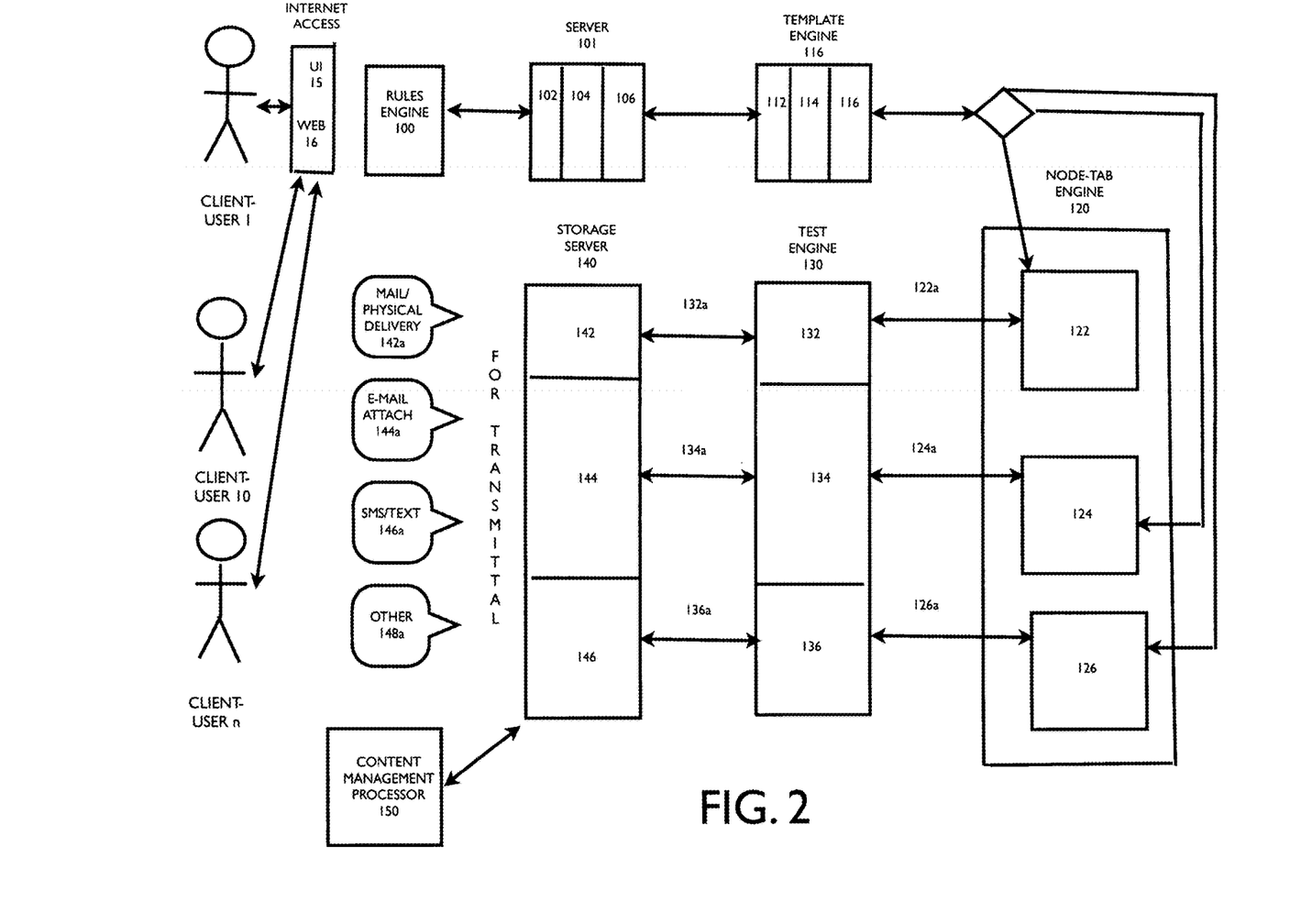
FIG. 2 is a diagrammatic representation of an example of a generalized configuration of a number of customized document creation system interface modules in accordance with an embodiment of the invention.

FIG. 2 illustrates, in block form, a diagrammatic representation of an example of a generalized configuration of a number of customized document creation system interface modules in accordance with an embodiment of the invention. A Client-user 1 may access the system through a Client-user 1 interface 15 (also referred to as UI 15) that is specific to the Client-user 1 or may access the system through a Web-portal 16 at the supplier's Web site to which the Client-user 1 has password protected access.

The present invention allows the Client-user 1 to designate multiple access privilege levels to personnel within the Client-user 1. Thus, by way of example, the Client-user 1 may designate an administrative user 18 (who may or may not be part of the package 45 design group) to grant access rights and privileges to other personnel, both within and without the Client-user 1. The administrative user 18 may designate certain personnel to provide text while others provide graphics and may permit the personnel to communicate with one another to interact to generate the Custom Document and package 45. One mode for permitting the interaction is to limit the area that each person can access on any given template 31, while another is to create a series of Rule/Instructions that define what area or portion of each template 31 may be accessed by each person.

Figure 3:
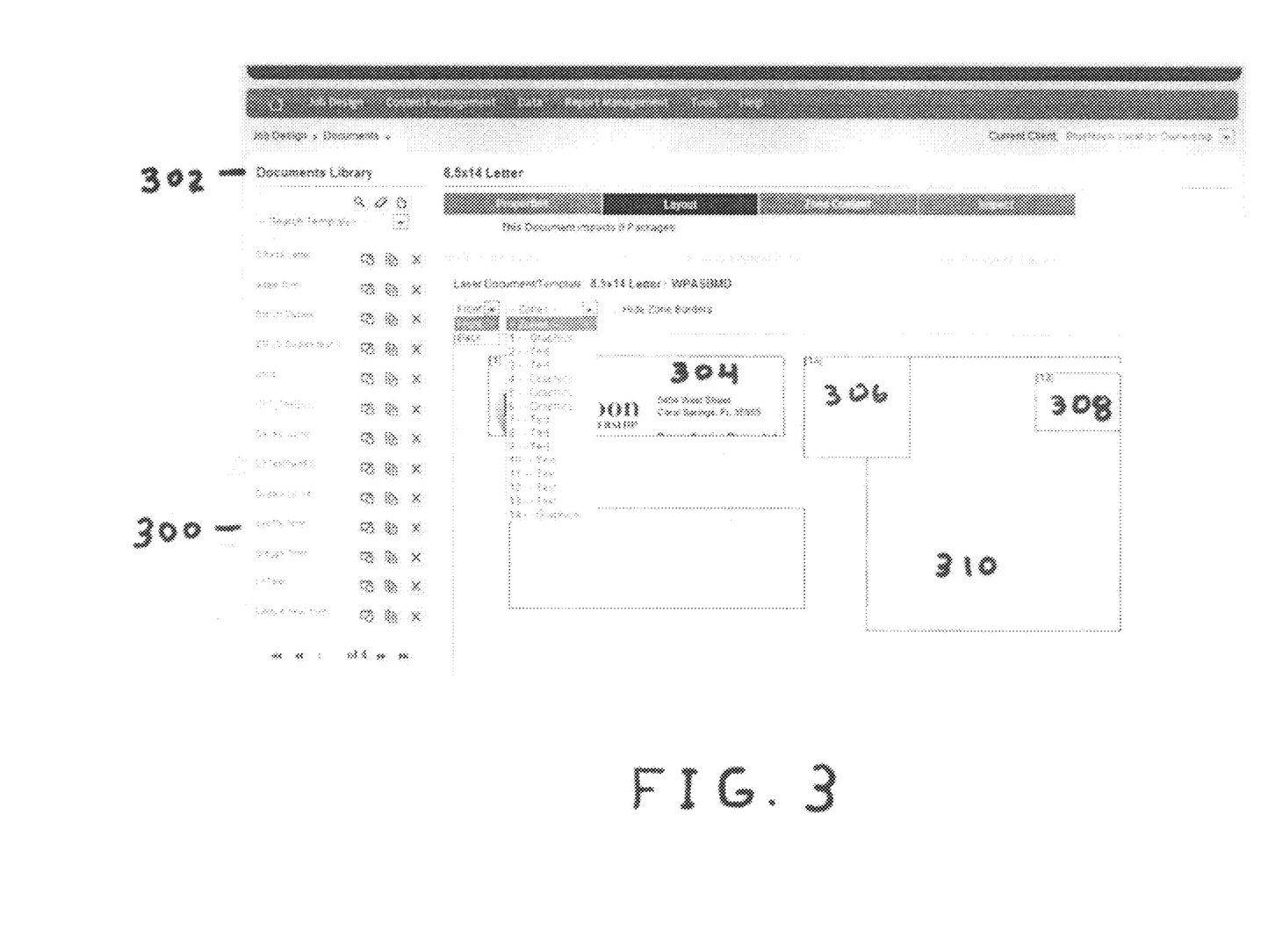
FIG. 3 is an example of a multi-zone layout employed in a customized document creation system in accordance with an embodiment of the invention.
Figure 4:
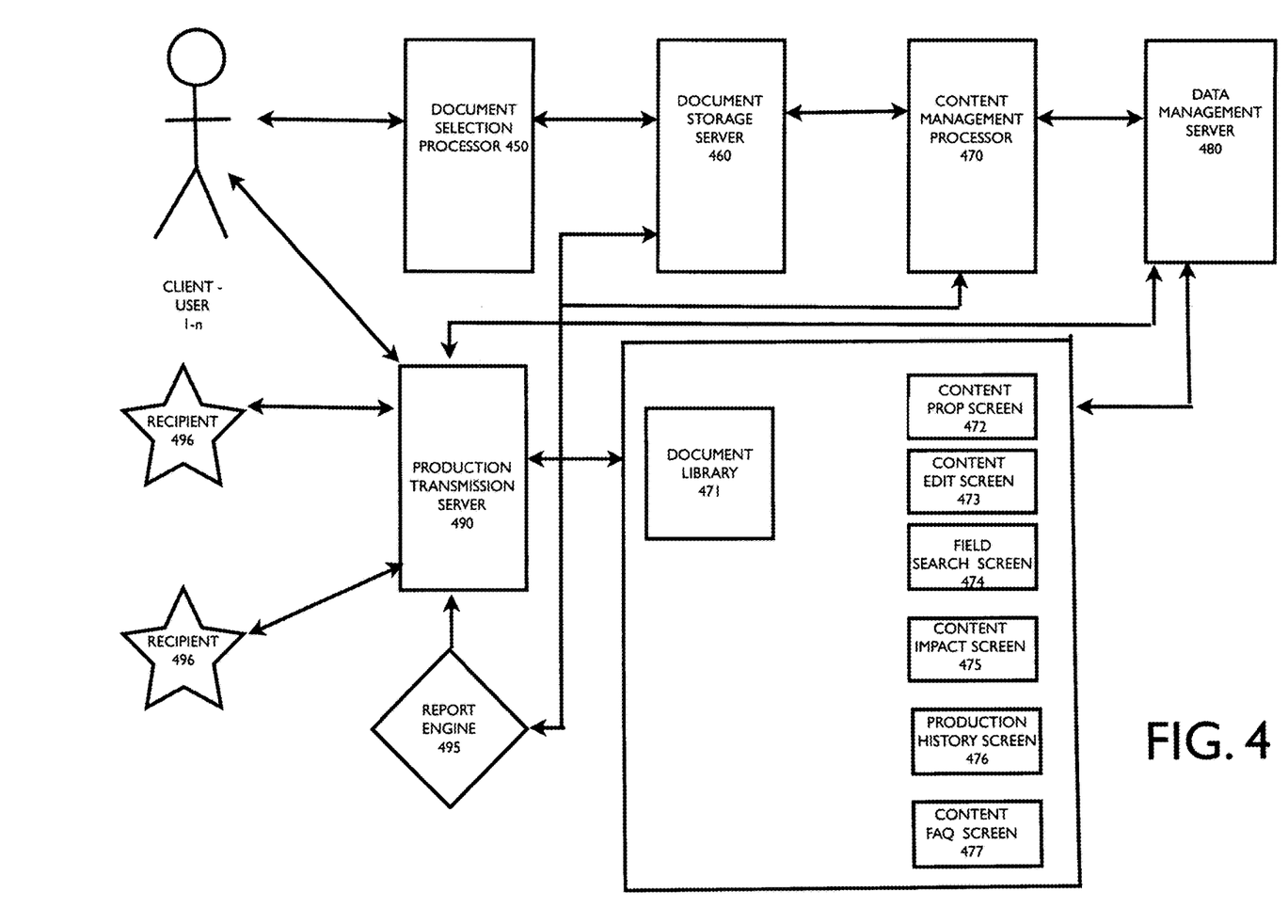
FIG. 4 is diagram illustrating the compilation of packages for transmittal as an example of a multi-documents generation by a customized document creation system in accordance with an embodiment of the invention.

As is illustrated in FIG. 2 and FIG. 4, multiple Client-users 1 through n (hereinafter also referred to as "Client 1-*n*") may access the system at the same time to generate Custom Documents. Each Client-user 1-*n* may access the system via a UT 15 or a secure entry Web portal. Each Client-user 1-*n* may have established a set of individual Rules/Instructions which are advantageously stored in a Rules engine 100. As is illustratively shown in FIG. 3, if the Client-user 1-*n* is working on an existing Custom Document, the Client-user 1-*n* will be presented with an interface that will include a menu 300 that is integrated with the Rules engine 100 and provides, by way of example, access to a document library 302. Alternatively, if the Client-user 1-*n* is starting a new Custom Document, they will be presented with an interface (not shown) which will include a menu that is integrated with the Templates 30A and provides zones that may be accessed and integrated with text, graphics and other material, in accordance with the dictates of the Client-user 1-*n*. While the client Rules/Instructions define the specific inputs and other aspect of the workflow process, the system also provides the client with automated rejections in the event that the Rules/Instructions are inherently non-compliant with the submitted data record. Thus, for example, if the field <Statement Balance>, which inherently should have a debit value (money owed), instead reflects a credit balance, the system suppresses the data record and prevents it from being mailed. Other automated Rules/Instruction rejections form a part of the system and the above is only intended to be an example of the automated manner in which the system adapts, edits and monitors the work as a function of the Rules/Instruction and the ultimate material output to ensure accuracy.

By way of illustration, and not as a limitation, each Client-user 1-*n* may access server 101 which may be partitioned, either by use of separate storage systems or by software with appropriate firewalls, into multiple storage areas 102, 104 and 106 (the use of three areas is not a limitation and additional areas may be partitioned, depending on the number of Client-users 1-*n*). Each Client-user 1-*n* will commence or continue work on one or more Custom Documents by accessing a Template 30A from a template engine 110. Multiple components or zones of each Template 30A will be visible to the Client-user 1-*n*.

As an example, there may be a logo zone 304 into which a Client-user 1-*n* may insert a specific letterhead, logo, address or other identifying material which may either be imported by the Client-user 1-*n*, may be stored on the system or may be a part of a previously created Custom Document found in the storage device 60. The zone may be limited to text or to graphics, in accordance with one or more Rules/Instructions or may be available for either or for some other form of media insert.

As each zone is either filled or specifically left blank, the Rules/Instruction are applied to actually insert the text, graphic or other material to the Template 30A to build the Custom Document. Furthermore, node-tabs may be employed to create and file zones within zones. Thus, for example, a zone 306 may be advantageously established that bridges a larger zone 310 while simultaneously extending outside of zone 310 into the body of the Template 30A. A further variant would be to provide a zone 308 that is fully within larger zone 310. It will be appreciated by those skilled in the art that the zone variations are not limited and may be adapted or created by each Client-user 1-*n*, the entity providing the system or others with administrative access to the system.

A further element of the invention is that the work-flow may either be implemented in an ordered or non-ordered manner such that, if a Client-user 1-*n* determines that a certain part of a Custom Document needs to be generated first in order to lay out the subsequent portions, the Client-user 1-*n* may implement an ordered access in which one personnel member will be provided sole access. Once that zone is established and finalized, a personnel member will be provided access to a subsequent zone. The personnel members may or may not be the same, depending on the designation by the Client-user 1-*n*. Alternatively, the Client-user 1-*n* may permit multiple personnel to access the Custom Document simultaneously and in any order. Various other access modes may be implements to provide variable work flow where ordered and non-ordered Rules/Instructions may be employed to permit sections of the Custom Document to be accessed at any time during the creation process, while others zones are not capable of being accessed until one or more previous steps or actions are undertaken by some set of personnel who are involved in a prior step or determination.

In order to permit multiple personnel from multiple Client-users 1-*n* to access and employ the system simultaneously, the Custom Document work-flow permits personnel to instruct a node-tab engine 120 to contribute, edit, fill in or otherwise modify a Template 30A or multiple Templates 30A. Thus, for example, if multiple Custom Documents are to be generated, each one of which with a header or logo at the same location, the Rules/Instruction engine 100 will instruct the node-tab engine that the header or logo be inserted in the same zone on each Custom Document, thus minimizing error and increasing efficiency in the process.

Different personnel at a Client-user 1-*n* may be shown different templates 30, different zones within a given template 30 or may only be shown a zone or template 30 after it has been shown to or worked on by other personnel, based on their specific and assigned roles. For example, personnel with text access rights may not be shown graphic zones and all personnel, other than executive level, may be denied access to accounting zones that may contain confidential information.

The design elements for each Client-user 1-*n* may employ one or more of the hierarchical matrix functions and interfaces within the system. By way of example, the hierarchical matrix may have, a Custom Document work flow from a document to a package to an email, with custom tables for insertion at various zones and ultimate campaign creation through aggregation of Custom Documents for distribution over a period of time. The Custom Document workflow is further augmented by a Custom Data Table module that permits dynamic control of numerous content and formatting elements that impact the overall Custom Document and interface with the Client's Rules/Instructions. The Custom Data Table module may have search capabilities to permit a Client to search for and obtain pieces of content for use or may permit the Client to display and pull content. Without limiting the various functionalities that may be part of the Custom Data Table, some of the functions that are found therein that benefit the Client and contribute to the ease of customizing of documents are dynamic control of images in an Image Library module, dynamic control of content in the Content module and dynamic use and modification, if desired, of Client Rules/Instructions that permit the automated integration of the contents, images and other elements that are displayed and the Rules/Instructions that govern their interrelationship and overall impact.

Whereas one Client-user 1-*n* may want to have a Custom Document processed and produced for distribution once, another Client-user 1-*n* may also want to establish multiple temporal distribution of one or more Custom Documents. Accordingly, a Client-user 1-*n* may set up repetitive processing such that the same Custom Document or package is processed on a regular basis (eg. once a month) to create a cycle and then a series of cycles may be executed to create a campaign.

In one aspect of the invention, a campaign cycle editor may be employed to permit a Client-user 1-*n* to reuse Custom Documents, combine and recombine them, edit them prior to distribution determine time frames for distribution and otherwise define the properties of any campaign that a Client-user 1-*n* wants to set up.

Once the personnel at a particular Client-user 1-*n* complete their required tasks and employ the node-tab engine 120 to fill in the requisite zones to generate their respective Custom Documents 122, 124 and 126, those Custom Documents 122, 124 and 126 are transmitted to test engine 130 where each is further examined and reviewed by administrative level personnel at each respective Client-user 1-*n*. The test engine 130 may simultaneously be evaluating and aggregating multiple documents for each Client-user 1-n as well as assembling packages for each Client-user 1-n to ultimate distribution.

In one aspect of the invention, the test engine 130 may be advantageously employed as a web application that the information technology group at the system provider may implement at each Client-user 1-n to give each access to their various jobs, packages and Templates 30A that the Client-user 1-n may wish to use for processing. After implementation, each Client-user 1-n will have the capability of maintaining the system access, jobs, packages and templates 30 to permit them to make changes as needed and to preview each Custom Document on the fly. This will permit each Client-user 1-n to more rapidly finalize a Custom Document and elevate it within the Client-user 1-n to the appropriate administrative level to obtain approval for distribution.

Following approval, the Custom Documents 142, 144 and 146 may be transmitted to a storage server 140 for aggregation into packages, for distribution or to be held for further content management. In a further element of the system, the content of each Custom Document may be managed via a content management processor 150. Each Custom Document may be accessed and searched by either a keyword or name. To employ a keyword, personnel with appropriate access rights may enter a word or phrase and search one or more of the Custom Documents to locate the content described. Alternatively, personnel may enter a NAME that will search for any specific designated NAME that has been given to the content (eg. HISTORY) and locate that NAME where it is associated with each Custom Document.

Once the content has been located, the content management processor 150 of the system will permit appropriately designated personnel to perform one or more of the following content management functions: edit the content, set up new content, alter text or graphics, alter the properties of the content and search the Custom Documents to determine how the content edit impacts the remainder of the Custom Document. The above is not intended to be an exhaustive or a self-limiting list of the content management functions and those skilled in the art will be able to amplify and modify the above.

Figure 5:
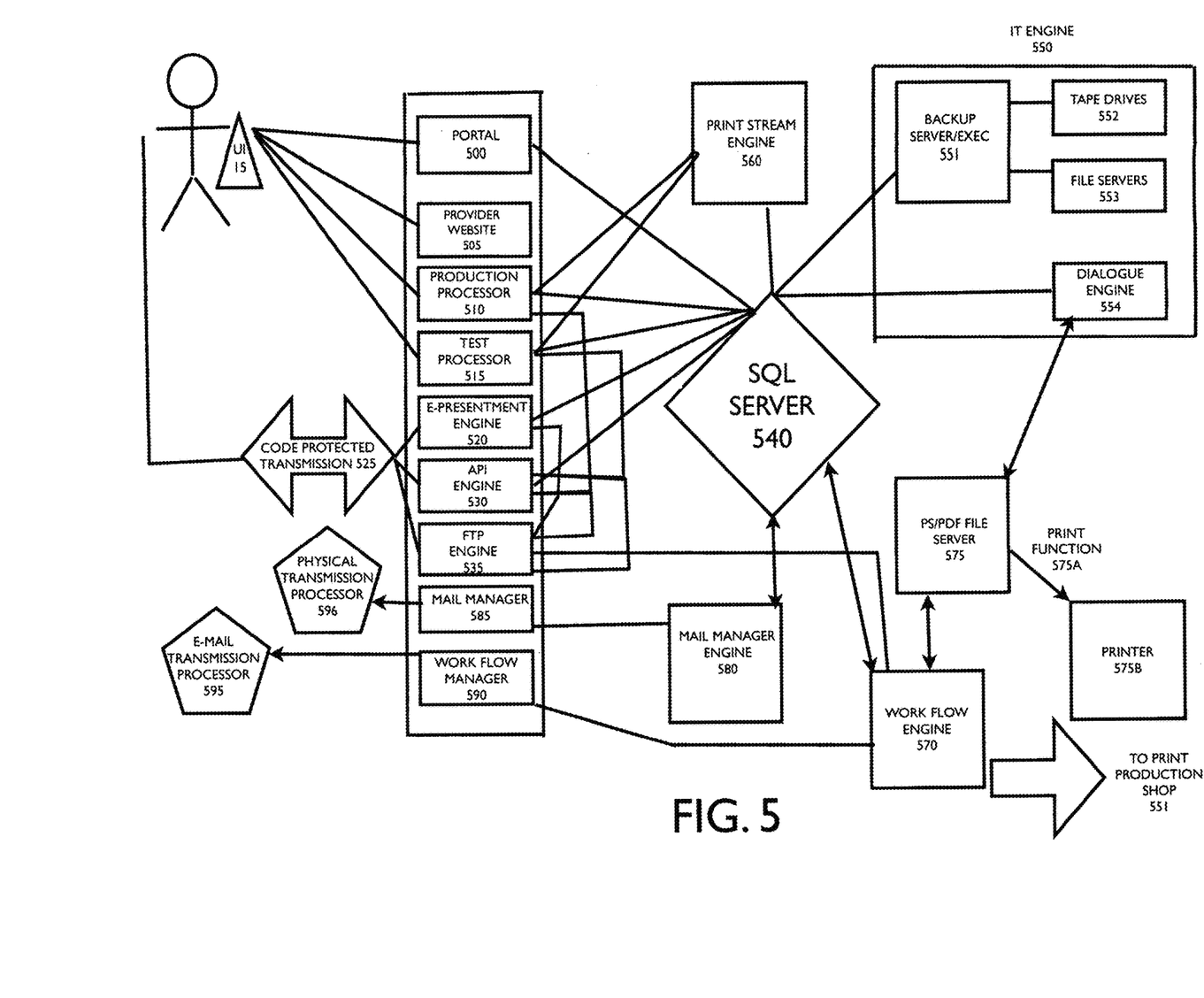
FIG. 5 is an access point/distribution point flowchart illustrating a custom document methodology and system for generation, finalization and transmittal of customized documents by the system in accordance with an embodiment of the invention.

As is seen illustratively in FIG. 2, FIG. 4 and FIG. 5, the methods of distribution may be by physical mail 142a, attachment to an electronic mail 144a or via SMS/Text protocol 146a as well as other means that one skilled in the art may determine appropriate. In the event that the transmission means is by physical mail 142a, the Custom Document or the package 45 may be sent to a print production shop 550 where the physical elements of the package 45 are printed and the package 45 is assembled and sent to a master mail manager 555 for ultimate posting. If the transmission means is electronic, the package 45 may be sent to a master email transmission processor 560 by a workflow manager 565. The email transmission processor 560 may be internal to the Client-user 1-n or may be done by the system provider directly or through an outside volume email vendor 570.

The email transmission processor 560 may also be employed in conjunction with a safe e-mail Opt-In module, to permit the transmission of an e-mail communication by a Client-user 1-n to a customer rather than sending the material in printed form. The customer is notified of the ability to receive the material by e-mail and is permitted to Opt-in via a secure communication option. The Client 1-n may select any type of unique identification value from their input file in order to permit the secure communication. By way of example only, the Client 1-n may employ both the customer's e-mail address and account or member number as a type of unique identification value. The Client 1-n has the further option of providing an Opt-in customer with customizable reports and other material and having it delivered electronically, as well as being able to track when it was delivered and when it was opened and read by the Customer.

In yet another aspect, the system provides the capability of permitting Clients 1-n who have financial information or who need to communicate financial data to a customer to do so in a secure environment. The Client 1-n may inform the customer of the need to provide confidential information and request that the customer log into a secure site using any one of a number of Client 1-n designated authentication field values which can be part of the Client 1-n data input file. An example of such an authentication field/value would by a customer's email and Personal Identification Number ("PIN"). Once the customer has complied, they are directed to as secure mail server module which gives the customer the information and is capable of transmitting payment receipt data, notification of withdrawal to pay account and other financial information. The secure mail server module further provides the Client 1-n with a real-time and dynamic history of a customer's payment history and other related information to permit follow up communications and confirmations.

Referring again to FIG. 4, there is shown an illustrative system, in accordance with one aspect, of the invention, for the compilation of packages for transmittal, and as an example of a multi-document generation system by a customized document creation system in accordance with an embodiment of the invention. The Client-user 1 may access a document selection processor 450 that is functionally associated with a document storage server 460. The Client-user 1 selects one or more documents from the document storage server 460, adapts, modifies or otherwise customizes them (or not as the Client-user 1 determines) through a content management processor 470.

The content management processor 470 may have operational aspects that permit it to search a document library 471 and select a document. The content management processor 470 may have various' screens to permit the Client-user 1 to manipulate, edit and customize the selected document. Illustrative screens may include a content property screen 472, a content editor screen 473, a field search screen 474, a content impact screen 475, a production history screen 476 and a content FAQ screen 477. Other screens may be created by the system supplier, either independently or in response to a request by a Client-user 1.

Once the Client-user 1 has completed generation of the Custom Document or Documents, they are transmitted to a data management server 480 where each of the Custom Documents is reviewed, approved by administrative personnel with appropriate authority. A production file 485 containing the completed set of one or more Custom Documents is uploaded and transmitted to a production and transmission server 490.

While the invention has generally be described in relation to the creation of one or more Custom Documents, it will be appreciated that it has similar applicability to the creation of document compilations and multipage documents such as reports. Referring to FIG. 4 there is illustratively depicted an aspect of the invention by which the Client-user 1-n may elect to generate a report 495A comprised of multiple documents or based upon other data and inputs. In such instances, the Client-user 1-n may access the document selection processor 450 and a report engine 495 to permit the report 495A to be created either from data on documents, new data imported for the report 495A or other criteria established by the Client-user 1-*n*. The report 495A may be established with named parameters to populate the fields and those parameters may either be included in the report 495A or left out, with just the resulting data being included.

The reports 495A may be printed or emailed whenever there are records and data that meet the criteria set up in Rules/Instruction engine 20. Thus, illustratively, the report 495A may be generated and transmitted whenever there is an accounts receivable update received, or it can be scheduled to go out at the end of each week. Alternatively, it may be scheduled as a one-time report to go out on a give date. The report 495A properties and data may be verified prior to transmittal and may be altered on the fly to eliminated old data and insert new data. Once the report 495A is approved, it may be transmitted to recipients 496 either in physical or electronic format with copied going back to Client-user 1. One example of a report 495A that may have old data removed and new data inserted, but which may also have substantial parts untouched is a proxy statement with associated voting requests. Additionally, the Rules/Instruction engine 20 may also include an instruction to transmit a reminder e-mail to the proxy recipient either because it has been determined that a proxy has not been received, or as general reminder, depending on the Client's Rule/Instruction. Additional functionality may further include to automated preparation of an election summary report and other summary analyses, depending on the nature of the proxy. This functionality may also be advantageously employed in connection with documents other than proxies where a Client determines that they need reminders sent out or that they need to automatically generated interim and final summaries of the response to the mailing.

Referring further to FIG. 5, there is illustratively depicted an access point/distribution point flowchart illustrating a custom document methodology and system for generation, finalization and transmittal of customized documents by the system in accordance with an embodiment of the invention. Each Client-user 1-*n* may be allowed direct access to the system through its own UI 15 to its portal 500 or may access the system through the system provider's website 505. Each Client-user 1-*n* may also access or provide its personnel access to and interface with the system's production processors 510 and test processors 515 which are used for processing all jobs and Templates 30A.

Each Client-user 1-*n* may also preview all Custom Documents and alterations or changes to Custom Documents on the fly through the production processor 510 and test processor 515. Each of the Client-users 1-*n* access and view points permit e-mail interaction between internal personnel at each Client-user 1-*n* and the system so that the personnel, depending on access privileges allotted to each of them, can either view, change, manipulate and or finally approve for transmittal the final Custom Document or package 45 without having to go to the system provider's facility.

Each Client-user 1-*n* is provided access to a presentment engine 520 through secure, Client-user 1-*n* code protected transmission means 525 which also permit additional access to an application programming interface ("API") engine 530 and a file transfer protocol ("FTP") engine 535. The File Transfer Protocol is a standard network protocol used to transfer computer files from one host to another host over a TCP-based network, such as the Internet.

The API engine 530 specifies how the software components should interact with each other.

In addition to accessing databases or computer hardware, such as hard disk drives or video cards, the API engine 530 can be used to ease the work of programming graphical user interface components. The API engine 530 comes in the form of a library that includes specifications for routines, data structures, object classes, and variables or, notably for SOAP and REST services, the API engine 530 comes as just a specification of remote calls exposed to the API engine 530 Client-users 1-*n*.

The FTP engine 535 may be built on a client-server architecture and use separate control and data connections between the Client-user 1-*n* and the server. FTP Client-users 1-*n* may authenticate themselves using a clear-text sign-in protocol, normally in the form of a username and password, but can connect anonymously if the server is configured to allow it. For secure transmission that protects the username and password, and encrypts the content, the FTP engine 535 may be secured with SSL/TLS (FTPS). SSH File Transfer Protocol (SFTP) may sometimes also used instead, but is technologically different.

Referring further to FIG. 5, it can be appreciated that the access points and related engines require control and interaction and are viewed by an SQL server 540 that serves as the principal relational database management system. Structured Query Language ("SQL") is a special-purpose programming language designed for managing data held in a relational database management system (RDBMS). SQL consists of a data definition language and a data manipulation language. The scope of SQL includes data insert, query, update and delete, schema creation and modification, and data access control. Although SQL is often described as, and to a great extent is, a declarative language it also includes procedural elements.

SQL server 540 may advantageously use a common set of tools to deploy and manage databases both on-premises, at the system provider and in the cloud, which makes it easier for Client-user 1-*n* to take advantage of all three. The SQL server 540 may access and manage the system provider's IT engine 550, which may include one or more back-up servers 551, tape drives 552, file servers 553 and a Dialogue/HP EX STREAM engine 554 through which the system provider's IT department can interact with the Client-user 1-*n* and the Custom Documents.

Moreover, the SQL server 540 may also access and manage the print stream engine 560 and work flow engine 570 through data insert, query, update and delete, schema creation and modification, and data access control, thereby ensuring that the information from the production engine 510 and test engine 515 are properly integrated, applied and transmitted. As a part of the access and control, the Dialogue/HP EX STREAM engine 554 may, in conjunction with the work flow engine 570, specify and access a PS/PDF file server 575 to direct a print function 575A.

As a further aspect of an element and functionality of the invention, the system, through its Review Output module, permits each Client to review a pdf of the live record output and all of the records that form part of a prospective mailing package before it is sent to the production department. The Review Output module allows for a review of all records before they complete processing and reach the production department. A Client can review each file that is then pending and "Ready for Review" and can select that file or files that are representative of the mailing package. If a file is not yet ready for review, the Review Output module will list it as "Importing" or by some other designation that indicate it is still being processed prior to review. Use of the Review Output module permits a Client to check each inventory item associated with a file and permits the Client to reject any record or other data entry that they ultimately do not want to make part of the final file processing.

Upon receipt of final, confirmed authorization from appropriate personnel at the Client-user 1-*n* that a Custom Document is to be transmitted and the mode of transmission is designated, SQL server 540 may direct either the work flow engine 570 or a mail manager engine 580 to transmit the Custom Document. The transmittal may be either by physical deliver, email attachment, SMS/Text or other Client-user 1-*n* designated transmittal modes.

Without seeking to limit scope of the invention, other aspects and functionality may be appreciated by referring to FIG. 1 through FIG. 5 and the above specification wherein the following interactions and applications may be employed to further enhance the ability of Client-user 1-*n* to create, finalize, have published (in electronic, physical or other format) and transmit data and Custom Documents.

Web Apps: Client-user 1-*n* and/or their customers may access web applications. Web applications act as clients to SQL server 540 behind a firewall. Web site information may be served only via SSL-encrypted channel unless specifically requested by a Client-user 1-*n*.

Prod/Test: is the web application that the IT department uses to implement all clients with the jobs and templates that will be used for processing. After implementation, most clients take over maintenance and keep making changes as needed. Changes can be previewed on the fly and go through an elevation process that requires approval from the appropriately designated users.

API web services: web services provided to a Client-user 1-*n* that wants to interface their code with the system's functionality such as recall and generate PDF information from archived data.

API Push web services: web services provided to Clients that want to interface their code with the system's functionality to submit one-off/push data that will be used for creating PDF output and become available for accessing via FTP, Download or Email.

Custom data file formats may be supported for Client-user 1-*n* data submitted into/out from the system provider. Client-user 1-*n* may have the option to manually submit files on irregular schedules or to code file transmission to happen on a scheduled basis.

ePresentment: unlike the API web services, some Client-user 1-*n* may want to integrate their customer web site's code to only show an embedded web page that the system provide hosts for searching, listing and accessing PDF files of all items mailed or emailed to the Client-user 1-*n* customers. This set of web pages may be provided over an SSL-encrypted channel that accepts the appropriate parameters to ensure the Client-user 1-*n* requested data is displayed and ready to be accessed by their customers.

Workflow Manager: guides the file received from the Client-user 1-*n* through the whole process (workflow) until the PS (PostScript), AFP or PDF output is created. Files are picked up from FTP, parsed into the SQL server 540 database, inserted into the appropriate tables, based on custom Client-defined Rules/Instructions, the workflow then goes on to validate mail address with the CASS/NCOA (national change of address) service with the mail manager engine 580 for transmittal. Changed addresses are updated in the database, invalid addresses are rejected into a file to be sent to the Client-user 1-*n* or ignored (based on custom Rules/Instructions). Splits based on presort sequence and mailing Rules/Instructions may be created to maximize the Client-user 1-*n* savings on postage. As a further part of the Workflow Manager, the system permits validation of both the delivery and the delivery point within the workflow process. Thus, in the event that an email communication is bounced back or it otherwise not deliverable or is not read within a client defined time/data range, the system will determine the non-delivery and will generate a "hard copy" of the communication with attachments. That "hard copy" will be deemed a package and will be mailed to ensure that they communication is ultimately delivered to the customer. The email reports section of the Workflow Manager also provides a Query Builder module that permits a client to determine if an email is "Successful" in that it has been delivered. The Workflow Manager also provides validation that the delivery point is correct and that the various elements of the delivery point coordinate with one another. Thus, by way of example, the Delivery Point Validation may note that the city of destination is New York, but that the zip code is for an area in New Jersey. Other forms of Delivery Point Validation are within the scope of this invention to further ensure the accuracy and deliverability of each communication, such as automatic detection of domains that do not exist, an incorrect domain extension or other types of transmission errors or rejections.

Dialogue/HP Exsteam services may be invoked to create the PS/PDF files that will be sent to the system provider's production floor. In the cases where the workflow requires emailing instead of mailing, the workflow may be instructed to avoid processing the extra steps that would be required for mailing. Email addresses are validated and sent through a volume email vendor by using their web services. Results from the email submission action are reflected back into the database.

PS/PDF/AFP files: may be directed the workflow engine 570 to be printed into the corresponding paper, preprinted materials are inserted, folded, package is inserted into envelope and mailed out.

SQL server 540 databases may contain historical data that will be retained for the duration of the archival/retention period (customized by Client-user 1-*n* request). This data can be used to regenerate any mailed item within the retention period. Review, re-prints are available from within the system to convert into PDF for printing on a one-off basis.

Dialogue/HP Exstream engine 554 may be employed to transform data from a database into PostScript, AFP and PDF files. The Dialogue/HP Exstream engine 554 allows embedding PS/AFP control code for indicating high volume printers to execute tray selection with different media, inserting pre-printed documents, duplex and simple printing within the same job and other functionality available in high volume printers and inserters. Generally, the system provider's IT group programs and sets up the Templates 30A corresponding to the scope of the initial implementation for each client.

A PrintStream engine 590 may be used to manage the business process to manage all aspects of a print and letter shop, including mailing costs. In one embodiment, information may be sent to the PrintStream engine 590 in such a manner as to avoid multiple repetitive data entry points and minimize data entry errors and costs.

The backup engine 551 is used to run backups of all servers. Backups are sent to a secure facility.

Although the foregoing has been described in some detail for purposes of clarity, it will be apparent that certain changes and modifications may be made without departing from the principles thereof. It should be noted that there are many alternative ways of implementing both the systems and methods described herein. Accordingly, the present embodiments are to be considered as illustrative and not restrictive, and the invention is not to be limited to the details given herein, but may be modified within the scope and equivalents of the appended claims. Further, the present invention is not limited to the embodiment's described above, and variations, substitutions, combinations of elements and derivative means and systems may be undertaken and implemented by those skilled in the art and are all within the scope of the claims set forth hereinafter.

What is claimed is:

1. A Client-user client implemented document and communication creation system for generating a communication by a Client-user that is external to the document creation system to a third party that is also external to the document creation system, the system comprising:
   a. a processor configured to be accessed by a terminal of the Client-user via a web portal of a website of the system;
   b. a non-transitory computer readable storage medium storing instructions that, when executed, cause the system to perform the actions designated by the terminal;
   c. a data storage server capable of storing at least one external Client-user generated rule/instruction;
   d. at least one template wherein the template has a data-insertable zone therein;
   e. a communication server to transmit external Client-user specified data insertion instructions from the terminal to the processor;
   f. a Node-tab to insert the transmitted external Client-user specified data into the zone, in accordance with at least one external Client-user generated rule/instruction;
   g. a test server configured to permit review at the terminal and a final approval from the terminal of the communication containing the external Client-user specified data, wherein the test server is configured to receive the communication after the transmitted external Client-user specified data has been inserted into the zone, wherein the review comprises presentation of the communication including the transmitted external Client-user specified data and the template, wherein the test server is configured to receive sign-off from an authorized person using the terminal;
   h. a merge and transmit engine to designate a transmission mode specification and transmit the finally approved communication in accordance with the transmission mode specification, wherein the test server is configured to receive the communication from the merge and transmit engine after aggregation of the transmitted external Client-user specified data and the template but before transmission of the finally approved communication, wherein final approval of the finally approved communication is determined by the test server based on sign-off received via the terminal;
   i. an application programming interface (API) engine with protected transmission configured to permit access to the API engine by the terminal; and
   j. a data storage server for receiving communication aggregation, wherein multiple communications, including the communication, are aggregated and transmitted as a single communication.

2. A system in accordance with claim 1, wherein the specified data comprises text.

3. A system in accordance with claim 1, wherein the specified data comprises graphic materials.

4. A system in accordance with claim 1, wherein the specified data comprises visual material.

5. A system in accordance with claim 1, wherein the specified data comprises contextual media.

6. A system in accordance with claim 1, further comprising a template data storage server.

7. A system in accordance with claim 1, further comprising a communications storage server.

8. A system in accordance with claim 7, wherein the external Client-user's specified data insertion instructions obtain the data from a communication in the communications storage server.

9. A system in accordance with claim 1, further comprising a proxy module having on-line response mean wherein a recipient of a proxy or other material may respond to the proxy by electronic response or hard copy response, which may then be converted to electronic compilation of responses.

10. A system in accordance with claim 1, further comprising a compliance module to permit material to be reviewed at various points in the production cycle to ensure compliance with the external Client-user's internal rules and/or compliance with state, federal and other statutory and regulatory rules.

11. A system in accordance with claim 1, further comprising a content management processor to view compliance with the external Client-user's client-user-specified data instructions in real time.

12. A system in accordance with claim 1, wherein the transmission mode is selected from a group comprising one or more of the following: physical delivery means; electronic delivery means; electronic mail attachment delivery means; and/or SMS/text delivery means.

13. A method for generating a Client-user created and implemented document and communication by a Client-user that is external to the document creation system to a third party that is also external to the document creation system, the method comprising:
   a. providing access to a processor of the system by the terminal via a web portal of a website of the system;
   b. storing, on a non-transitory computer readable storage medium instructions that, when executed, cause the system to perform the actions designated by the terminal;
   c. storing at least one external Client-user generated rule/instruction;
   d. providing at least one template wherein the template has a data-insertable zone therein;
   d'. providing access by the terminal using protected transmission to an application programming interface (API) engine of the system;
   e. transmitting external Client-user specified data insertion instructions from the terminal to the processor;
   f. inserting the transmitted external Client-user specified data into the zone, in accordance with at least one external Client-user generated rule/instruction;
   f'. aggregating a plurality of communications including the communication as a single communication;
   g. processing, by a test server of the system, a final approval from the terminal, of the communication containing the external Client-user specified data, wherein the test server receives the communication after the transmitted external Client-user specified data has been inserted into the zone, wherein the review comprises presentation of the communication including the transmitted external Client-user specified data and the template, wherein the test server receives sign-off from an authorized person using the terminal;
   h. processing a transmission mode specification; and i. transmitting the finally approved communication as the single communication including multiple communications in accordance with the transmission mode specification, wherein the test server receives the communication after aggregation of the transmitted external Client-user specified data and the template but before transmission of the finally approved communication, wherein final approval of the finally approved communication is determined by the test server based on sign-off received via the terminal.

14. A method in accordance with claim 13, wherein the specified data comprises text.

15. A method in accordance with claim 13, wherein the specified data comprises graphic materials.

16. A method in accordance with claim 13, wherein the specified data comprises visual material.

17. A method in accordance with claim 13, wherein the specified data comprises contextual media.

18. A method in accordance with claim 13, further comprising a template data storage server.

19. A method in accordance with claim 13, further comprising delivery of data to a proxy/response-indicated module capable of on-line response, delivery of data from the proxy/response-indicated module to a recipient wherein the recipient may respond to the proxy or other response-indicated communication by electronic response or hard copy response, which may then be converted to electronic compilation of responses.

20. A method in accordance with claim 13, further comprising delivery of data to a compliance module to permit said data to be reviewed at various points in the production cycle to ensure compliance with the external Client-user's internal rules and/or compliance with state, federal and other statutory and regulatory rules.

21. A method in accordance with claim 13, further comprising a communications storage server.

22. A method in accordance with claim 21, wherein the external Client-user's specified data insertion instructions are obtained from a communication in the communications storage server.

23. A method in accordance with claim 13, further comprising viewing compliance with the external Client-user's specified data instructions in real time.

24. A method in accordance with claim 13, wherein the transmission mode is selected from a group comprising one or more of the following: physical delivery; electronic delivery; electronic mail attachment delivery; and/or SMS/text delivery.

* * * * *